(12) United States Patent
Williams et al.

(10) Patent No.: US 12,406,212 B2
(45) Date of Patent: Sep. 2, 2025

(54) AUTOMATED OPTIMIZATION OF EVENTS BY ENGAGEMENT AND FORMAT

(71) Applicant: AT&T Intellectual Property I, L.P., Atlanta, GA (US)

(72) Inventors: Emily Williams, Dallas, TX (US); Ni An, Fremont, CA (US); Prateek Baranwal, Dallas, TX (US); Kelly Dowd, Dallas, TX (US); James Pratt, Round Rock, TX (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 258 days.

(21) Appl. No.: 17/861,397

(22) Filed: Jul. 11, 2022

(65) Prior Publication Data
US 2024/0013104 A1    Jan. 11, 2024

(51) Int. Cl.
*G06Q 10/04*     (2023.01)
*G06Q 10/02*     (2012.01)
*G06Q 30/0201*   (2023.01)

(52) U.S. Cl.
CPC ............. *G06Q 10/04* (2013.01); *G06Q 10/02* (2013.01); *G06Q 30/0201* (2013.01)

(58) Field of Classification Search
None
See application file for complete search history.

(56) References Cited

U.S. PATENT DOCUMENTS 11,138,567 B1 * 10/2021 Schmoldt ......... G06Q 10/06393
11,321,786 B1 *  5/2022 Zamer ................... G06Q 50/01
(Continued)

FOREIGN PATENT DOCUMENTS

WO    WO-0025248 A2 *   5/2000 ............. G06Q 99/00
WO    WO-2009134259 A1 * 11/2009 ......... H04L 12/1822
(Continued)

OTHER PUBLICATIONS

Yuxin et al "A statistical approach to participant selection in location-based social networks for offline event marketing Author links open", Apr. 2019, Information Sciences vol. 480, pp. 90-108 (Year: 2019).*

(Continued)

*Primary Examiner* — Romain Jeanty
(74) *Attorney, Agent, or Firm* — Hartman & Citrin LLC

(57) ABSTRACT

Concepts and technologies disclosed herein are directed to automated optimization of events by engagement and format. According to one aspect disclosed herein, an event management system can create an event for a specified topic based upon input provided, at least in part, by an event creator. The input can identify initial event content, a plurality of event attendees, a location for the event, and an event presenter. The event management system can receive a selection of a desired audience for the event. The event management system can accept the initial event content to be presented during the event and can determine a time for the event. The event management system can perform engagement sampling during the event. The event management system can utilize the selection, the time, and the engagement sampling to optimize the event. The event management system can determine a follow-up action to be performed after the event.

14 Claims, 7 Drawing Sheets

(56) References Cited

U.S. PATENT DOCUMENTS

| | | | | |
|---|---|---|---|---|
| 2005/0216576 A1* | 9/2005 | Nastacio | ............... | H04L 69/40 |
| | | | | 709/224 |
| 2014/0172483 A1* | 6/2014 | Bellers | ............... | G06Q 10/025 |
| | | | | 705/7.19 |
| 2014/0372650 A1* | 12/2014 | Caskey | ............... | H04L 51/046 |
| | | | | 710/261 |
| 2016/0110669 A1* | 4/2016 | Iyer | ............... | G06Q 10/06315 |
| | | | | 705/7.25 |

FOREIGN PATENT DOCUMENTS

| | | | | |
|---|---|---|---|---|
| WO | WO-2009134260 A1 * | 11/2009 | ......... | H04L 12/1822 |
| WO | WO-2016205813 A1 * | 12/2016 | ........... | G06F 19/322 |

OTHER PUBLICATIONS

Pedrielli "Discrete Event Optimization: Single-Run Integrated Simulation-Optimization Using Mathematical Programming", Dec. 2015, Proceedings of the 2015 Winter Simulation Conference, pp. 3557-3568 (Year: 2015).*

EVENTSAIR "Guest Post: Biometrics at Events: Security vs. Privacy", Dec. 2019, Eventsair, pp. 1-12 (Year: 2019).*

* cited by examiner

AUTOMATED OPTIMIZATION OF EVENTS BY ENGAGEMENT AND FORMAT

BACKGROUND

Workplace and social event engagement needs are increasing for both digital and in-person participation. As a result, the need to measure and drive those engagements automatically is similarly growing. These needs are traditionally met by a pre-study of what the relevant topics to an audience may be, the most opportune time to hold the event, and the format of the event. These paradigms can be improved with automation.

Often a formal system that measures workplace or social event engagement is not present during the event, or even afterwards. Additionally, systems that can dynamically modify content of an engagement, the presentation of that content, or the creation of the event for that engagement are not properly relegated to automated systems that can fully personalize the message for each participant.

The disbursement of information and content from an engagement event is not properly monitored for breadth of distribution, nor is the impact and resonance of the event (e.g., as measured by additional engagement, performance improvement, and the like) attributed to modifications, distributions, or predicted engagements.

SUMMARY

Concepts and technologies disclosed herein are directed to automated optimization of events by engagement and format. According to one aspect of the concepts and technologies disclosed herein, an event management system can create an event for a specified topic based upon input provided, at least in part, by an event creator. The input can identify initial event content, a plurality of event attendees, a location for the event, and an event presenter. The event management system can receive a selection of a desired audience for the event. In some embodiments, the selection is inferred by the event management system. In other embodiments, the selection is made manually by the event creator.

The event management system can accept the initial event content to be presented during the event and can determine a time for the event. The event management system can perform engagement sampling during the event. The event management system can obtain feedback during the event and after the event. The event management system can determine a follow-up action to be performed after the event.

In some embodiments, the event management system can determine a modification to the initial event content. The event management system can analyze the modification to determine whether to apply the modification to the initial event content. The event management system can apply the modification to the initial event content.

In some embodiments, the event management system can perform the engagement sampling to monitor a traditional activation of at least a portion of the plurality of event attendees. In some embodiments, the event management system can perform the engagement sampling to monitor a question and answer session in which at least a portion of the plurality of event attendees participate. In some embodiments, the event management system can perform the engagement sampling to monitor an event acceptance rate. In some embodiments, the event management system can perform the engagement sampling to mine a specific event topic for relevance. In some embodiments, the event management system can monitor a social interaction among at least a portion of the plurality of event attendees. In some embodiments, the event management system can monitor a biometric of at least a portion of the plurality of event attendees. In some embodiments, the event management system can monitor a multi-tasking interaction of at least a portion of the plurality of event attendees.

In some embodiments, the event management system can obtain the feedback from one or more of the plurality of event attendees. In some embodiments, the event management system can obtain the feedback from the event creator. In some embodiments, the event management system can obtain the feedback from the event presenter.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein are directed to automated optimization of events by engagement and format. According to one aspect disclosed herein, a system can analyze event audiences, event content, engagement, and distribution, and can offer modifications to any or all components to increase retention. The system can provide encoding of all event input from initial planning, including the intended audience(s) and the content specifications (e.g., how the content is delivered and formatted, what the key message is, the ideal outcome, and the like). The system can learn from input and real-time metrics to predict outcomes and dynamically adjust content format and delivery as needed. The format and delivery can vary from one audience member to another based upon their characteristics. The system can analyze the flow of information post-event from person to person. For example, the system can determine whether information on certain topics shared should be siloed or disseminated throughout an organization. The system can use input, real-time metrics and post-mortem metrics to guide future event decisions. For example, the system can use the learned information from a study of topic distribution breadth to adjust content to focus in on key topics in the future.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
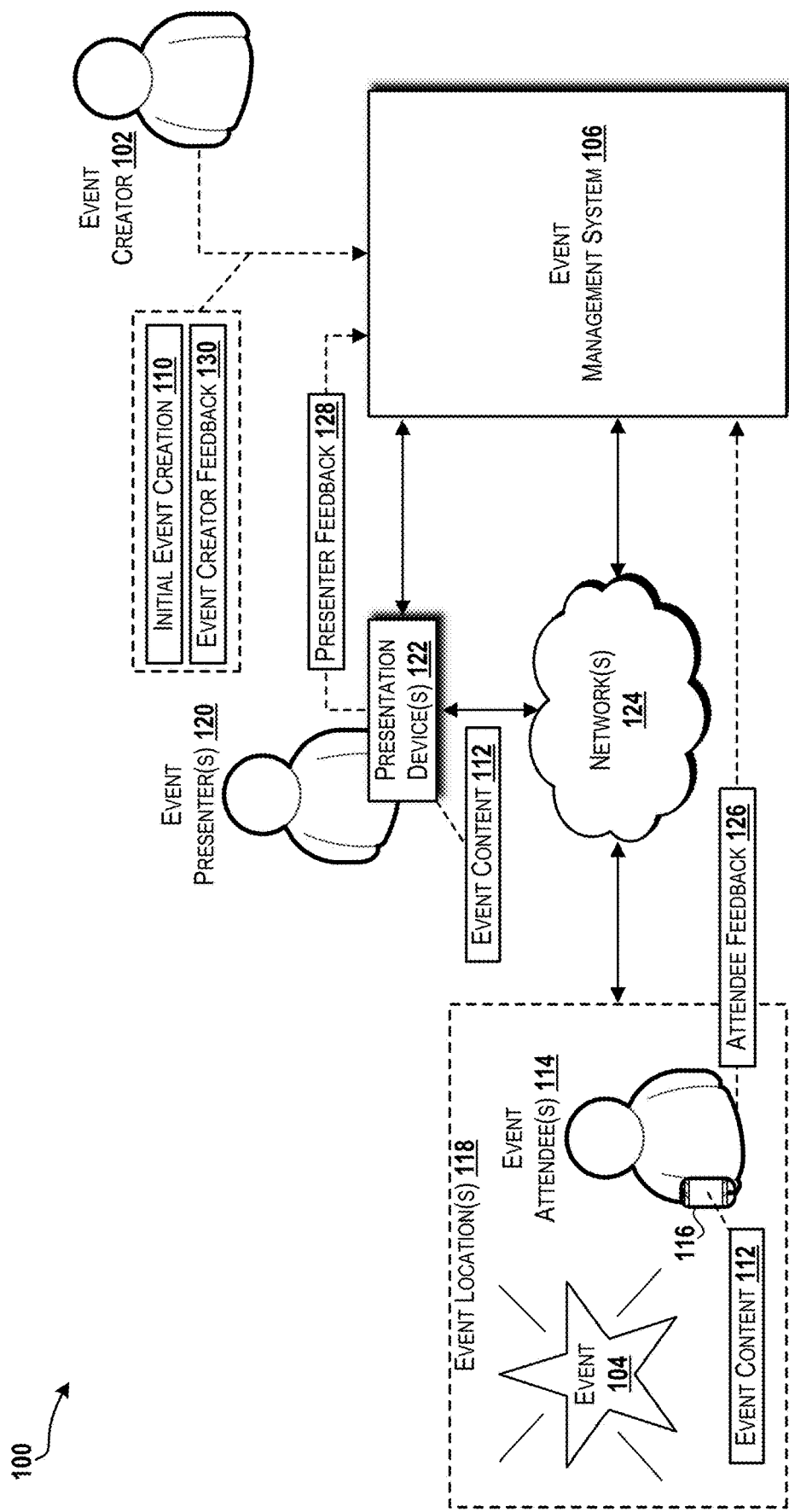
FIG. 1 is a block diagram illustrating aspects of an illustrative operating environment for various concepts and technologies disclosed herein.

Turning now to FIG. 1, an operating environment 100 in which aspects of the concepts and technologies disclosed herein can be implemented will be described. The operating environment 100 includes an event creator 102 that can create an event 104 via an event management system 106. In the illustrated example, the event creator 102 can provide input directly to the event management system 106. Alternatively, the event creator 102 can provide input to another system such as a computer, smartphone, tablet, or other system/device that, in turn, provides the input to the event management system 106 as part of an event creation process. Moreover, the event creator 102 is described as a human but alternatively may be an artificial intelligence ("AI"). The event creator 102 may be a single entity or multiple entities that each contribute, in part, to the creation of the event 104.

The event management system 106 enables the event creator 102 to provide all event input for initial planning (shown as "initial event creation 110"). The initial event creation 110 can identify event content 112. It should be understood that the event content 112 may be modified during the event 104 as will be described in greater detail herein. As such, the event content 112 identified in the initial event creation 110 may be referred to herein as initial event content 112, and the event content 112 that has been modified may be referred to herein as modified event content 112. The term "event content 112" therefore is intended to encompass the event content 112 as dynamic event content that may change over time. By way of example, and not limitation, the event content 112 can be or can include audio (e.g., live and/or recorded), video (e.g., live and/or recorded), still image(s), music, other digital media, digital or physical slide presentations, other physical media, combinations thereof, and/or the like. The event content 112 can be expressed as a specific topic or group of topics to be presented. The event content 112 can express what is the key message of the event 104, what is the ideal outcome of the event 104, and/or other aspects of the event 104. The event content 112 can be stored locally on the event management system 106 and/or remotely on another system (not shown). The event content 112 can be distributed, as needed, to other system(s) and/or device(s) described herein.

The initial event creation 110 can identify an intended audience such as one or more event attendees 114, who may be in-person attendees, remote attendees, or a combination of in-person and remote attendees. The event attendee(s) 114 may be identified by name, a user name, an email address, a unique identifier (e.g., a combination of letters, numbers, and/or other characters), or the like. The initial event creation 110 also can identify attendee device(s) 116 associated with the event attendee(s) 114. The attendee device(s) 116 may be a personal computer, a smartphone, a tablet, augmented reality device, virtual reality device, a combination thereof, and/or the like. In some implementations, only specific attendee devices 116 are allowed to be used during the event 104. The initial event creation 110 also can identify one or more event location(s) 118 in which the event 104 is to be held. The event location(s) 118 can be or can include one or more physical locations (e.g., a conference center) and/or one or more virtual locations (e.g., a specific uniform resource locator specific to the event 104).

The initial event creation 110 can identify how the event content 112 is to be delivered to the event attendee(s) 114 during the event 104. For example, the event content 112 may be delivered by one or more event presenters 120 with or without the aid of one or more presentation devices 122 (e.g., microphones, speakers, displays, and/or other presentation devices). The event presenter(s) 120 may be in-person and/or remote.

The event management system 106, the presentation device(s) 122, and the event attendee device(s) 116 can communicate via one or more networks 124. The network(s) 124 can be or can include one or more local area networks ("LANs"). The network(s) 124 can be or can include one or more wide area network ("WANs"). The network(s) 124 can include wired networks, wireless networks, or a combination thereof. In some embodiments, the network(s) 124 can be configured similar to or the same as an example network 500 illustrated and described herein with reference to FIG. 5.

The event management system 106 can learn from additional input and/or real-time metrics from the event creator 102, the event attendee(s) 114, the event presenter(s) 120, or some combination thereof. This input and real-time metrics are illustrated collectively as feedback, and more particularly, as attendee feedback 126 from the event attendee(s) 114, as presenter feedback 128 from the event presenter(s) 120, and as event creator feedback 130 from the event creator 102. The event management system 106 can utilize the attendee feedback 126, the presenter feedback 128, the event creator feedback 130, or some combination thereof to predict one or more outcomes of the event 104 and can dynamically adjust the format and/or delivery of the event content 112 as needed. For example, the format and delivery of the event content 112 can vary from one event attendee 114 to another.

The event management system 106 can analyze the flow of information after the event 104. As such, the attendee feedback 126, the presenter feedback 128, and the event creator feedback 130 can include additional input provided after the event 104 by the event attendee(s) 114, the event presenter(s) 120, and/or the event creator 102, respectively. In this manner, the event management system 106 can determine if information on certain topics shared during the event 104 should stay siloed within a group of the event attendees 114 or disseminated elsewhere, such as throughout an organization.

The event management system 106 can utilize the attendee feedback 126, the presenter feedback 128, and the event creator feedback 130 to guide future event decisions.

For example, the event management system 106 can use learnings from the study of topic distribution breadth to adjust the event content 112 to focus in on key topics in the future.

The event management system 106 can utilize an architecture the same as or similar to a computer system 300 that is illustrated and described with reference to FIG. 3. Alternatively, the event management system 106 can utilize an architecture the same as or similar to a mobile device 400 that is illustrated and described with reference to FIG. 4. The event management system 106 can be implemented on a virtualized cloud architecture 700 that is illustrated and described with reference to FIG. 7. The event management system 106 can be, can include, or can otherwise utilize a machine learning system 600 that is illustrated and described with reference to FIG. 6.

Figure 2:
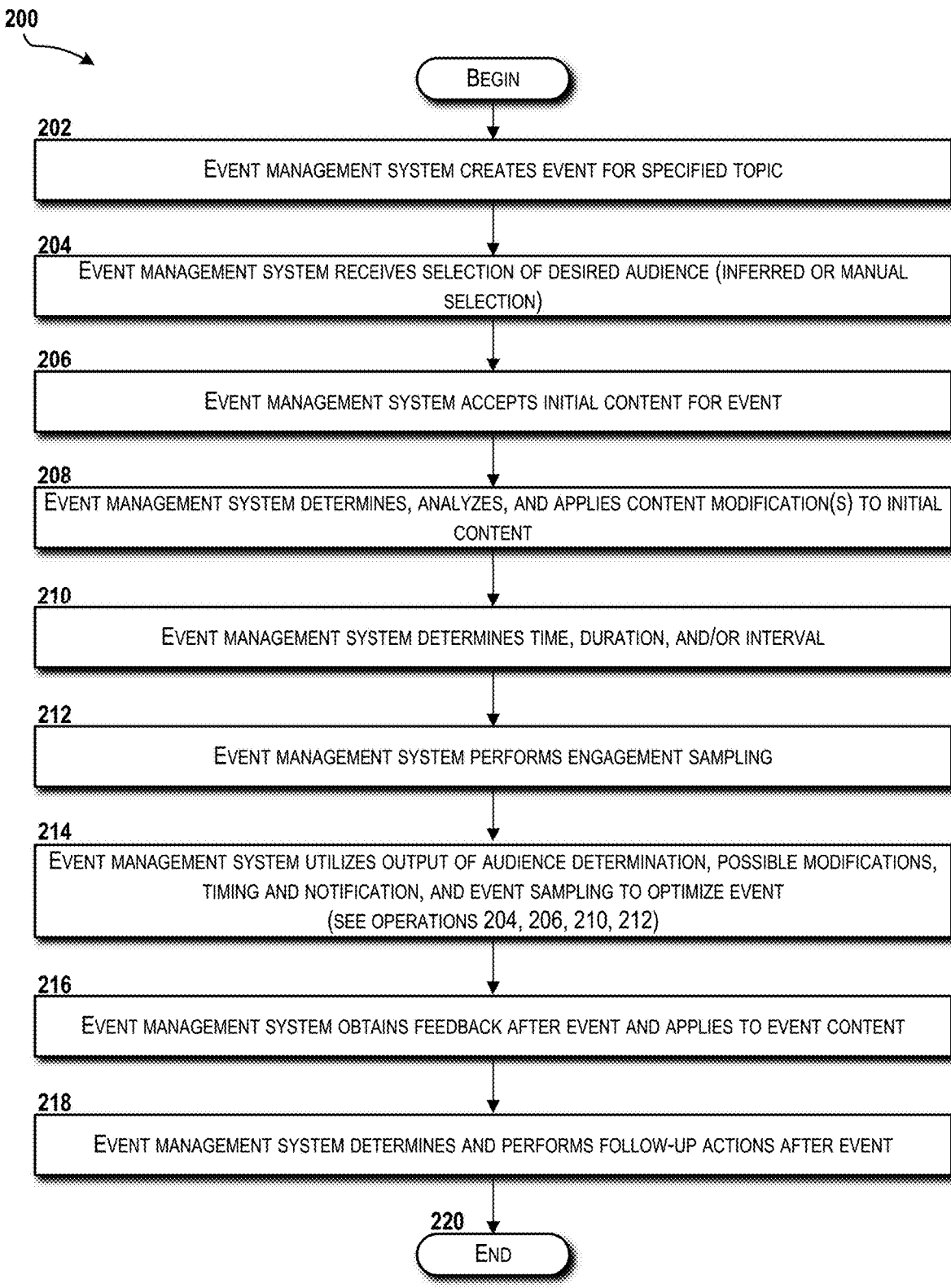
FIG. 2 is a flow diagram illustrating aspects of a method for automatically optimizing events by engagement and format, according to an illustrative embodiment of the concepts and technologies disclosed herein.

Turning now to FIG. 2, a flow diagram illustrating aspects of a method 200 for automatically optimizing events by engagement and format will be described, according to an illustrative embodiment. Although the method 200 will be described in context of a single event 104, the method 200 can be used for multiple events 104 and processed sequentially or simultaneously. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described from the perspective of the event management system 106 interacting with the event creator 102, the event attendee(s) 114, the event presenter(s) 120, and their associated devices. In some embodiments, the event management system 106 is located on-site at the event location 118 and can communicate with the event attendee device(s) 116 and the presentation device(s) 122 over the network 124 embodied, for example, as a WLAN. Alternatively, in other embodiments, the event management system 106 is located off-site from the event location 118 and can communicate with the event attendee device(s) 116 and the presentation device(s) 122 over the network 124 embodied, for example, as a WWAN. The event management system 106 can communicate with the event attendee device(s) 116 and the presentation device(s) 122 via multiple networks 124 such as a WWAN and a WLAN.

The method 200 begins and proceeds to operation 202. At operation 202, the event management system 106 creates the event 104 for a specified topic based upon input provided by the event creator 102 as part of the initial event creation 110 for initial planning. In particular, the initial event creation 110 can identify the event content 112, the event attendee(s) 114, the attendee device(s) 116, the event location(s) 118, the event presenter(s) 120, the presentation device(s) 122, how the event content 112 is to be delivered to the event attendee(s) 114 during the event 104, a combination thereof, and/or other aspects of the event 104.

From operation 202, the method 200 proceeds to operation 204. At operation 204, the event management system 106 receives a selection of a desired audience, including one or more of the event attendees 114. In some embodiments, the selection of the desired audience is a manual selection made, for example, by the event creator 102 (e.g., as identified as part of the initial event creation 110 or a separate selection made after the initial event creation 110). In some other embodiments, the selection of the desired audience is inferred by the event management system 106 based, for example, upon the topic of the event 104. In one embodiment, the audience selection process also conveys metadata about each audience member's preferences or profile. For example, the preference of one member to always receive event notifications via text message or only to show events during the final hours of a job assignment (e.g., the afternoon) may be known. In another example, the rank or role significance of an audience member may be included in the metadata such that each audience member is designated with tenure (e.g., how long they have been a part of the organization) or management level (e.g., entry level, manager, vice president, etc.) or responsibility for a particular function within an organization (e.g., customer interacting, financial, human resources, knowledge worker, etc.). While these examples of metadata are explicitly provided, other profile and/or metadata pieces also may be included and utilized in the subsequent decision-making operations of the event management system 106. Additionally, some metadata values may be directly computed by the event management system 106 from available data like the utilization number of peers that interact with a specific audience member to determine connectivity or reporting structures. In another embodiment, the metadata included with the audience may be aggregated in a way to compute consolidated preference scores, like a "VIP score," which may determine both preferences and topics of interest for a specific audience member.

From operation 204, the method 200 proceeds to operation 206. At operation 206, the event management system 106 accepts the initial event content 112. From operations 206, the method 200 proceeds to operation 208. At operation 208, the event management system 106 determines, analyzes, and applies any content modifications to the initial event content 112. In particular, the event management system 106 can modify the event content 112 for different audiences, for a different format delivery, and/or based upon expected knowledge and/or a prior understanding of the intended audience. For example, the event management system 106 can modify the delivery type, the delivery content, and the time and place of delivery. In one embodiment the event content 112 is modified to utilize only certain modalities, like audio channels, video or image channels, textual messages, or immersive (3D) content alone that corresponds to a specific attendee device 116. In another embodiment, the modifications may alter the event content 112 to sub-select different portions of content (e.g., speeches, close-up of a product or demonstration, etc.) to include as the primary content (e.g., a still image), but have secondary content (e.g., spoken description) be overlayed. In yet another embodiment, time-based regions of content 112 may be selected by the specific attendee 114 profile or prior description. In another embodiment, portions of the event content 112 may also be delivered based on the event location 118 of either of (or both of) the presenter 120 and the attendee 114.

From operation 208, the method 200 proceeds to operation 210. At operation 210, the event management system 106 determines a best time, duration, and/or interval for the event 104. The event management system 106 can rank the audience by a score to bias the aggregate message, planning, and/or time planned. The event management system 106 can measure an active workload, frustration level, and/or other sentiments of the event attendee(s) 114. In some embodiments, these metrics can be compared to historical values. Also at operation 210, the event management system 106 can send an event notification (not shown) of the event 104 to each of the event attendees 114. The event notification can be a digital notification such as an email, application message, or text message sent to the event attendee device(s) 116. The event notification can be a physical notification such as a physical invitation letter mailed to a physical address associated with the event attendee 114. In one embodiment, these notification types and preferences for receipt may be derived from profile information that was conveyed as metadata in operation 204. In another embodiment, the type of notification may be derived from the type of formatting and modifications that occurred at operation 206, where certain formats will receive more native notifications (e.g., text formatting receives text messages). In yet another embodiment, notifications may be sent by the event management system 106 during the event 104 to announce specific topics of the event content 112 (e.g., "special announcement for product Y in ten minutes") or specific audiences (e.g., "for users with children under years of age"), or specific functions (e.g., "all interns observing their first quadruple bypass") utilizing audience and metadata from operation 204.

From operation 210, the method 200 proceeds to operation 212. At operation 212, the event management system 106 performs engagement sampling during the event 104. For example, the event management system 106 can monitor traditional activations such as clickthrough, measure behavioral differences (e.g., delta from known linger, reaction time); the event management system 106 can monitor question and answer sessions; the event management system 106 can monitor event acceptance rate; the event management system 106 can mine specific event topics for relevance; the event management system 106 can monitor forwarding/social sharing (e.g., retweet, content sharing, and/or other social interaction) within a connected social network and/or across organizational and/or geographical boundaries; the event management system 106 can monitor biometrics of the event attendee(s) 114 (e.g., via one or more biometric sensors at the event location(s) 118 and/or as part of the event attendee device(s) 116) to understand attendee sentiment upon receipt of an event invitation, as well as interaction during the event 104; the event management system 106 can monitor multi-tasking and/or ancillary interactions (e.g., application connections, interactions, and network connectivity); and the event management system 106 can join engagement sampling data with historical engagement sampling data to determine live, pre-recorded, and skipped portions of similar events 104.

From operation 212, the method 200 proceeds to operation 214. At operation 214, the event management system 106 utilizes the outputs of audience determination (operation 204), possible modifications (operation 206), timing and notification (operation 210), and engagement sampling (operation 212) to optimize the event 104 and/or future iterations of the event 104. In this manner, the event management system 106 can monitor engagement changes during the event 104. The event management system 106 also can consider departures and/or interruptions by the event attendee(s) 114 to understand intentionality (e.g., due to a poor quality stream or an interrupter). Also at operation 214, the event management system 106 can optimize timing and format of the event content 112 (e.g., for different roles such as the event attendee(s) 114 and/or the event presenter(s) 120) through available modifications proposed in operation 206. The event management system 106 also can optimize scheduling for future follow-up and/or repeat events 104. In one embodiment, the follow-up and repeat events may be utilized to derive additional metadata for each audience member that describes durations of engagement and expected understanding rate for the event content 112. In one example, if the event 104 was a training session, a percentage of training received and the specific topics may be recorded in the audience member's profile metadata and used in subsequent event planning. In another example, as a means of legal or obligator notification of customers or members of a more coherent audience, the event management system 106 may ascribe completion rates, notification acceptance, and acceptance of updates for certain topics into secondary auditing or event participation systems. In another example, the failed or partial receipt of event content 112 from the event 104 may be logged and later aggregated for a concise summarization of content (and accompanying notification) in a different format that is utilized for a subsequent event 104.

From operation 214, the method 200 proceeds to operation 216. At operation 216, the event management system 106 obtains feedback, such as the attendee feedback 126, the presenter feedback 128, and/or the event creator feedback 130, after the event 104. Also at operation 216, the event management system 106 applies the feedback to the event content 112 for future iterations. In one embodiment, future iterations of the event or events of this type may include methods to modify the types of content for certain audience members, the amount of advanced notification for certain events, and the relevant modifications utilized within processing of the event 104 for the corresponding audience members. In another embodiment, if future events are known by the event management system 106 and are centered around nearly identical content (e.g., broadcasts of the event 104 across different time zones or regions throughout the world), the event management system 106 may apply dramatic content modifications to test the efficacy of each of those modifications (on both content format and notification type). In yet another embodiment, the format of the event content 112 may be modified for different audience sets while retaining certain portions of the event content 112. For example, certain audience members in a virtual space (e.g., an extended reality immersive experience) may appreciate the demonstration or specific product interactions within the event content 112 more than the introductory dialog, but the event creator 102 may have designated that introductory dialog as essential to any forms of the event 104. In another embodiment, external metrics not related to the event management system 106, such as employee or customer retention, may be introduced to the event management system 106 that, in turn, can further optimize the event 104 or its notifications as described above.

From operation 216, the method 200 proceeds to operation 218. At operation 218, the event management system 106 determines and performs follow-up actions after the event 104. In one embodiment, follow-up actions are determined by the rate of dissemination, consumption, or actions taken based on the event content 112. For example, the event management system 106 may monitor the rate of consumption (e.g., web- or video-based requests, clicks, opening of email, forwarding of event content 112, and/or the like) of both attendees within the event 104 and the peers of the attendees not in the event 104. In another example, data from topical sharing and search and asynchronous consumption of the event content 112 (e.g., excerpts, notifications, summarizations, and/or the like) may be monitored to understand the hierarchical or social distribution patterns of the content data throughout a larger audience set (e.g., the employees within an enterprise, the students of a class or university, or the customers within a product or market segment). As at operation 214, these observations may be utilized to modify future events, future event content, and/or the notifications around those events. In some embodiments, a follow-up action can result in one or more of the event attendees 114 being targeted with invites to similar future events based upon their consumption patterns and predicted relevance.

From operation 218, the method 200 proceeds to operation 220. The method 200 can end at operation 220.

Figure 3:
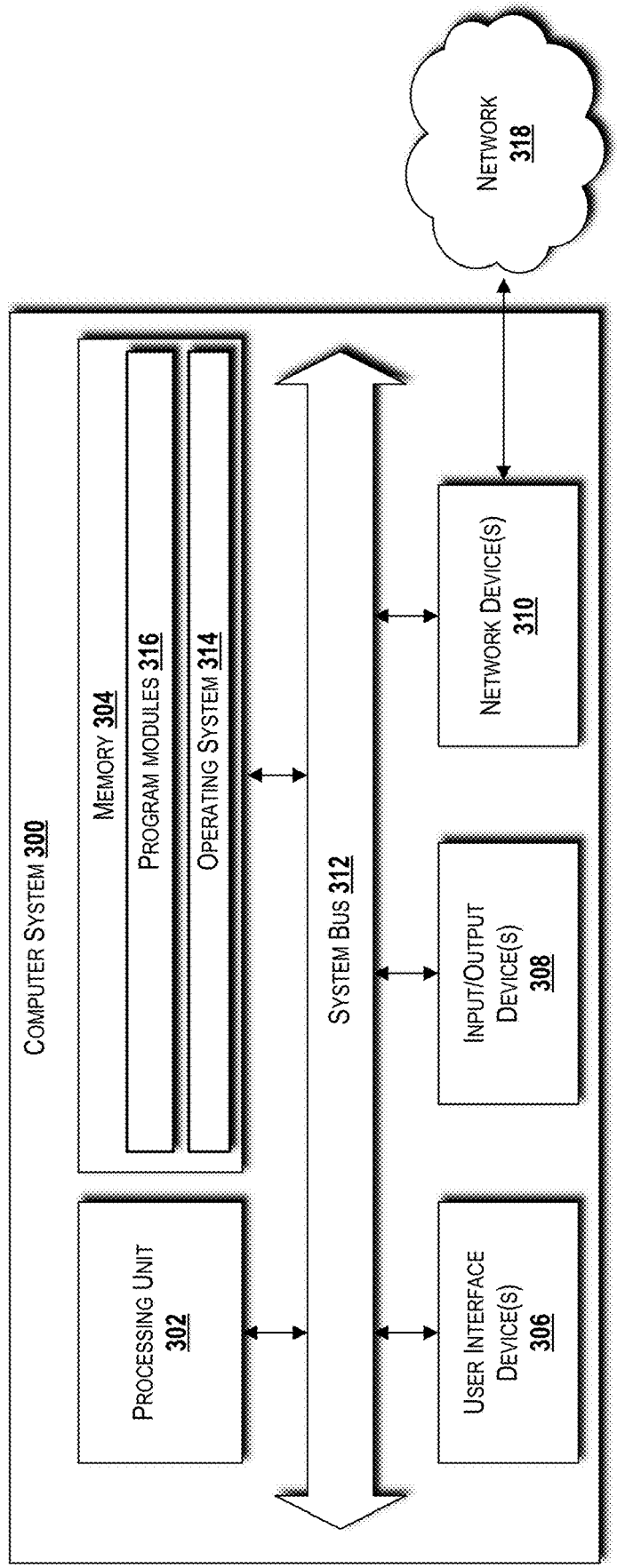
FIG. 3 is a block diagram illustrating an example computer system capable of implementing aspects of the concepts and technologies disclosed herein.

Turning now to FIG. 3, a block diagram illustrating a computer system 300 configured to provide the functionality described herein in accordance with various embodiments. In some embodiments, the event management system 106 can be configured the same as or similar to the computer system 300. In some embodiments, the event attendee device(s) 116 can be configured the same as or similar to the computer system 300. In some embodiments, the presentation device(s) 122 can be configured the same as or similar to the computer system 300.

The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 302 can be a single processing unit or a multiple processing unit that includes more than one processing component. Processing units are generally known, and therefore are not described in further detail herein.

The memory 304 communicates with the processing unit 302 via the system bus 312. The memory 304 can include a single memory component or multiple memory components. In some embodiments, the memory 304 is operatively connected to a memory controller (not shown) that enables communication with the processing unit 302 via the system bus 312. The memory 304 includes an operating system 314 and one or more program modules 316. The operating system 314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, the FREEB SD family of operating systems, the SOLARIS family of operating systems from ORACLE CORPORATION, other operating systems, and the like.

The program modules 316 may include various software and/or program modules described herein. The program modules 316 and/or other programs can be embodied in computer-readable media containing instructions that, when executed by the processing unit 302, perform the method 200 described herein. According to embodiments, the program modules 316 may be embodied in hardware, software, firmware, or any combination thereof. The memory 304 also can be configured to store the initial event creation 110, the event content 112, the attendee feedback 126, the presenter feedback 128, the event creator feedback 130, other data disclosed herein, or a combination thereof By way of example, and not limitation, computer-readable media may include any available computer storage media or communication media that can be accessed by the computer system 300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300. In the claims, the phrase "computer storage medium," "computer-readable storage medium," and variations thereof does not include waves or signals per se and/or communication media, and therefore should be construed as being directed to "non-transitory" media only.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 316. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display or printer.

The network devices 310 enable the computer system 300 to communicate with other networks or remote systems via one or more network(s) 318, such as the network(s) 124 introduced above in FIG. 1. Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 318 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 4:
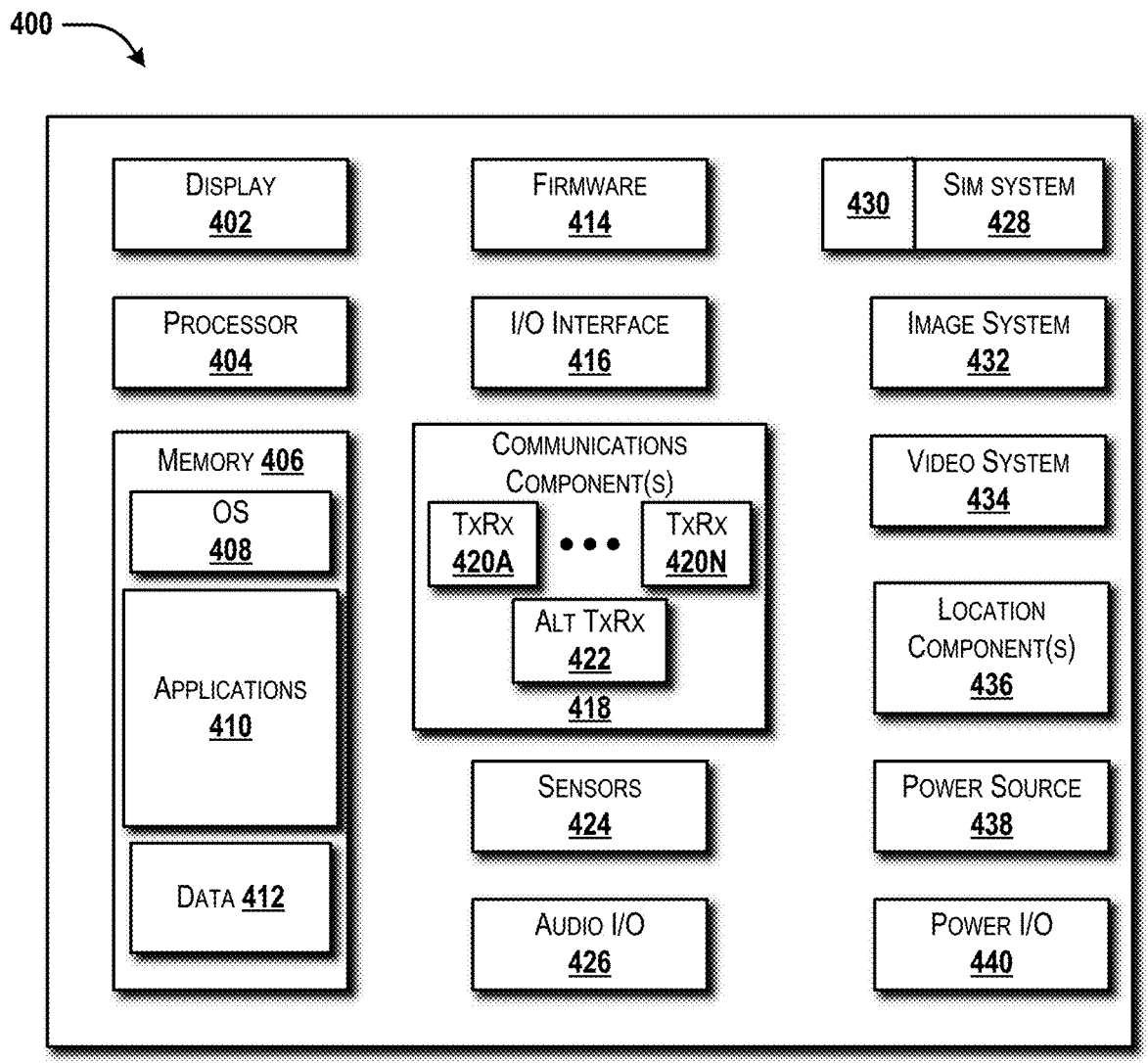
FIG. 4 is a block diagram illustrating an example mobile device capable of implementing aspects of the concepts and technologies disclosed herein.

Turning now to FIG. 4, an illustrative mobile device 400 and components thereof will be described. In some embodiments, the event management system 106 can be configured the same as or similar to the mobile device 400. In some embodiments, the event attendee device(s) 116 can be configured the same as or similar to the mobile device 400. In some embodiments, the presentation device(s) 122 can be configured the same as or similar to the mobile device 400. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 for displaying data. According to various embodiments, the display 402 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 400 can also include a processor 404 and a memory or other data storage device ("memory") 406. The processor 404 can be configured to process data and/or can execute computer-executable instructions stored in the memory 406. The computer-executable instructions executed by the processor 404 can include, for example, an operating system 408, one or more applications 410, other computer-executable instructions stored in the memory 406, or the like. The memory 406 also can be configured to store the initial event creation 110, the event content 112, the attendee feedback 126, the presenter feedback 128, the event creator feedback 130, other data disclosed herein, or a combination thereof.

The UI application can interface with the operating system 408 to facilitate user interaction with functionality and/or data stored at the mobile device 400 and/or stored elsewhere. In some embodiments, the operating system 408 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in entering/deleting data, entering and setting user IDs and passwords for device access, configuring settings, manipulating content and/or settings, multimode interaction, interacting with other applications 410, and otherwise facilitating user interaction with the operating system 408, the applications 410, and/or other types or instances of data 412 that can be stored at the mobile device 400.

The applications 410, the data 412, and/or portions thereof can be stored in the memory 406 and/or in a firmware 414, and can be executed by the processor 404. The firmware 414 can also store code for execution during device power up and power down operations. It can be appreciated that the firmware 414 can be stored in a volatile or non-volatile data storage device including, but not limited to, the memory 406 and/or a portion thereof.

The mobile device 400 can also include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 can also include a communications component 418. The communications component 418 can be configured to interface with the processor 404 to facilitate wired and/or wireless communications with one or more networks, such as the network 318, the Internet, or some combination thereof. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 418 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 418 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 418 can include a first transceiver ("TxRx") 420A that can operate in a first communications mode (e.g., GSM). The communications component 418 can also include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 can also include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 can also facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 can also include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 can also include a subscriber identity module ("SIM") system 428. The SIM system 428 can include a universal SIM ("USIM"), a universal integrated circuit card ("UICC") and/or other identity devices. The SIM system 428 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 can also include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content can also be shared with other devices via various types of data transfers via wired and/or wireless communication devices as described herein.

The mobile device 400 can also include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 can also be configured to communicate with the communications component 418 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 can also include a power source 438. The power source 438 can include one or more batteries, power supplies, power cells, and/or other power subsystems including alternating current ("AC") and/or direct current ("DC") power devices. The power source 438 can also interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 300 described above with reference to FIG. 3. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Figure 5:
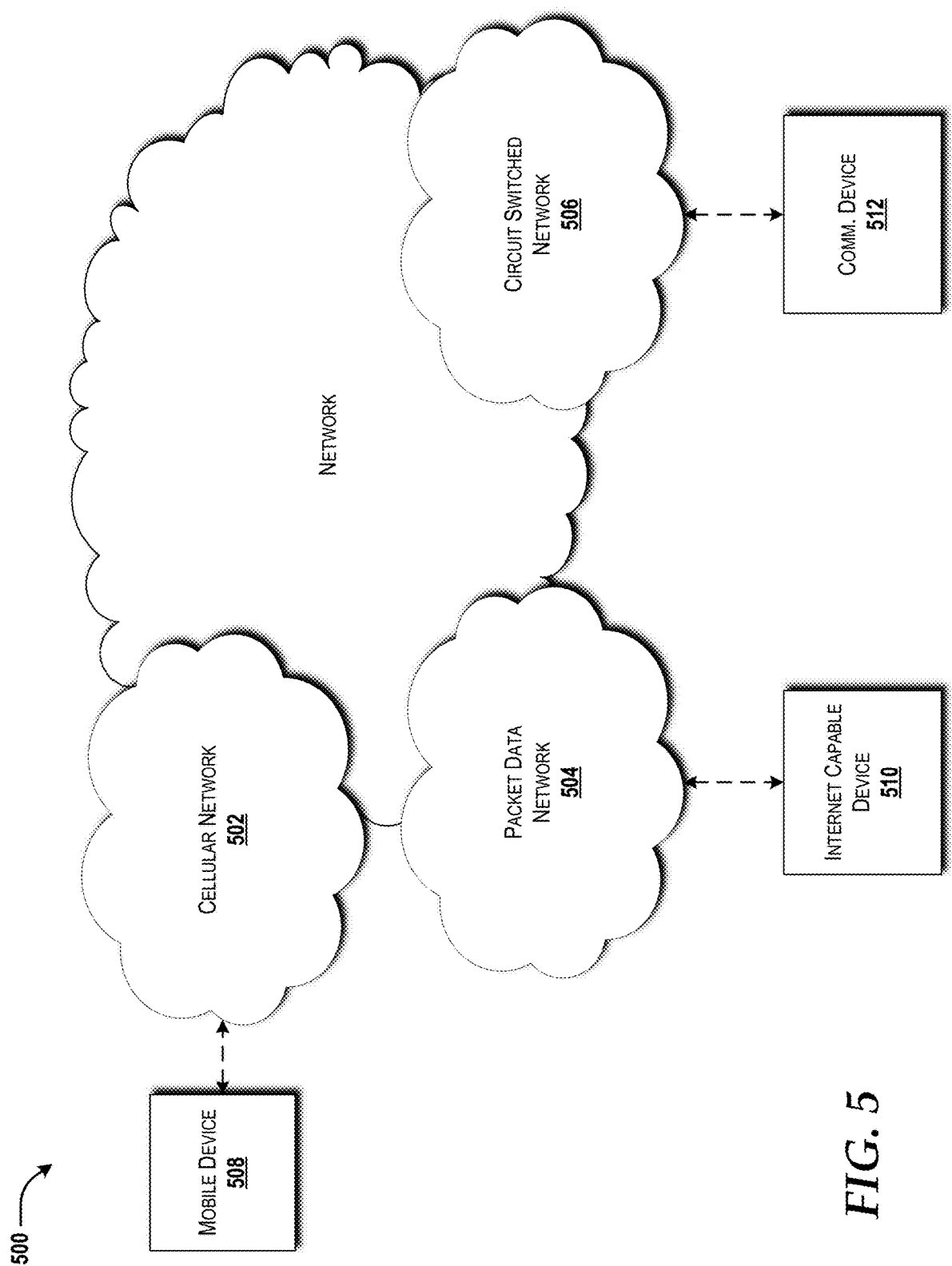
FIG. 5 is a block diagram illustrating an example network capable of implementing aspects of the concepts and technologies disclosed herein.

Turning now to FIG. 5, details of a network 500 are illustrated, according to an illustrative embodiment. In some embodiments, the network(s) 124 shown in FIG. 1 and/or the network 318 shown in FIG. 3 can be configured the same as or similar to the network 500. The network 500 includes a cellular network 502, a packet data network 504, and a circuit switched network 506 (e.g., a public switched telephone network). The cellular network 502 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the mobile device 400, a cellular telephone, a user equipment, a mobile terminal, a PDA, a laptop computer, a handheld computer, and combinations thereof, can be operatively connected to the cellular network 502. The mobile communications device 508 can be configured similar to or the same as the mobile device 400 described above with reference to FIG. 4.

The cellular network 502 can be configured as a GSM network and can provide data communications via GPRS and/or EDGE. Additionally, or alternatively, the cellular network 502 can be configured as a 3G Universal Mobile Telecommunications System ("UMTS") network and can provide data communications via the HSPA protocol family, for example, HSDPA, EUL, and HSPA+. The cellular network 502 also is compatible with mobile communications standards such as LTE, or the like, as well as evolved and future mobile standards.

The packet data network 504 includes various systems, devices, servers, computers, databases, and other devices in communication with one another, as is generally known. The event management system 106, the event attendee device(s) 116, the presentation device(s) 122, or some combination thereof can communicate with each other via the packet data network 504. In some embodiments, the packet data network 504 is or includes one or more WI-FI networks, each of which can include one or more WI-FI access points, routers, switches, and other WI-FI network components. The packet data network 504 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable systems/devices 510 such as the event management system 106, the event attendee device(s) 116, the presentation device(s) 122, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510.

Figure 6:
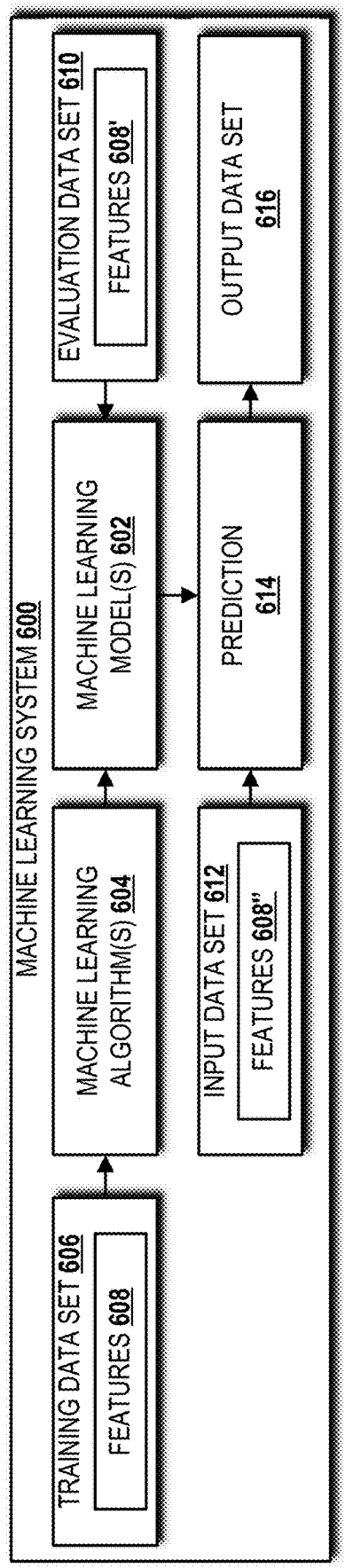
FIG. 6 is a block diagram illustrating an example machine learning system capable of implementing aspects of the concepts and technologies disclosed herein.

Turning now to FIG. 6, a machine learning system 600 capable of implementing aspects of the embodiments disclosed herein will be described. In some embodiments, aspects of the event management system 106, the event attendee device(s) 116, the presentation device(s) 122, or a combination thereof can be improved via machine learning. Accordingly, the event management system 106, the event attendee device(s) 116, the presentation device(s) 122, or a combination thereof can include or can be in communication with a machine learning system 600 or multiple machine learning systems 600.

The illustrated machine learning system 600 includes one or more machine learning models 602. The machine learning models 602 can include, unsupervised, supervised, and/or semi-supervised learning models. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, neural networks, gradient descent, linear regression, logistic regression, linear discriminant analysis, classification tree, regression tree, Naive Bayes, K-nearest neighbor, learning vector quantization, support vector machines, any of the algorithms described herein, and the like. Classification and regression algorithms might find particular applicability to the concepts and technologies disclosed herein. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. In some embodiments, the training parameters are selected modelers at the direction of an enterprise, for example. Alternatively, in some embodiments, the training parameters are automatically selected based upon data provided in one or more training data sets 606. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by the number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the resultant machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization.

The effectiveness of the resultant machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the resultant machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature that has a small weight value relative to the weight values of the other features in the training data set 606 can be adjusted to zero.

The machine learning system 600 can determine model accuracy after training by using one or more evaluation data sets 610 containing the same features 608' as the features 608 in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform a prediction operation ("prediction") 614 with an input data set 612 having the same features 608" as the features 608 in the training data set 606 and the features 608' of the evaluation data set 610. The results of the prediction 614 are included in an output data set 616 consisting of predicted data. The machine learning model 602 can perform other operations, such as regression, classification, and others. As such, the example illustrated in FIG. 6 should not be construed as being limiting in any way.

Figure 7:
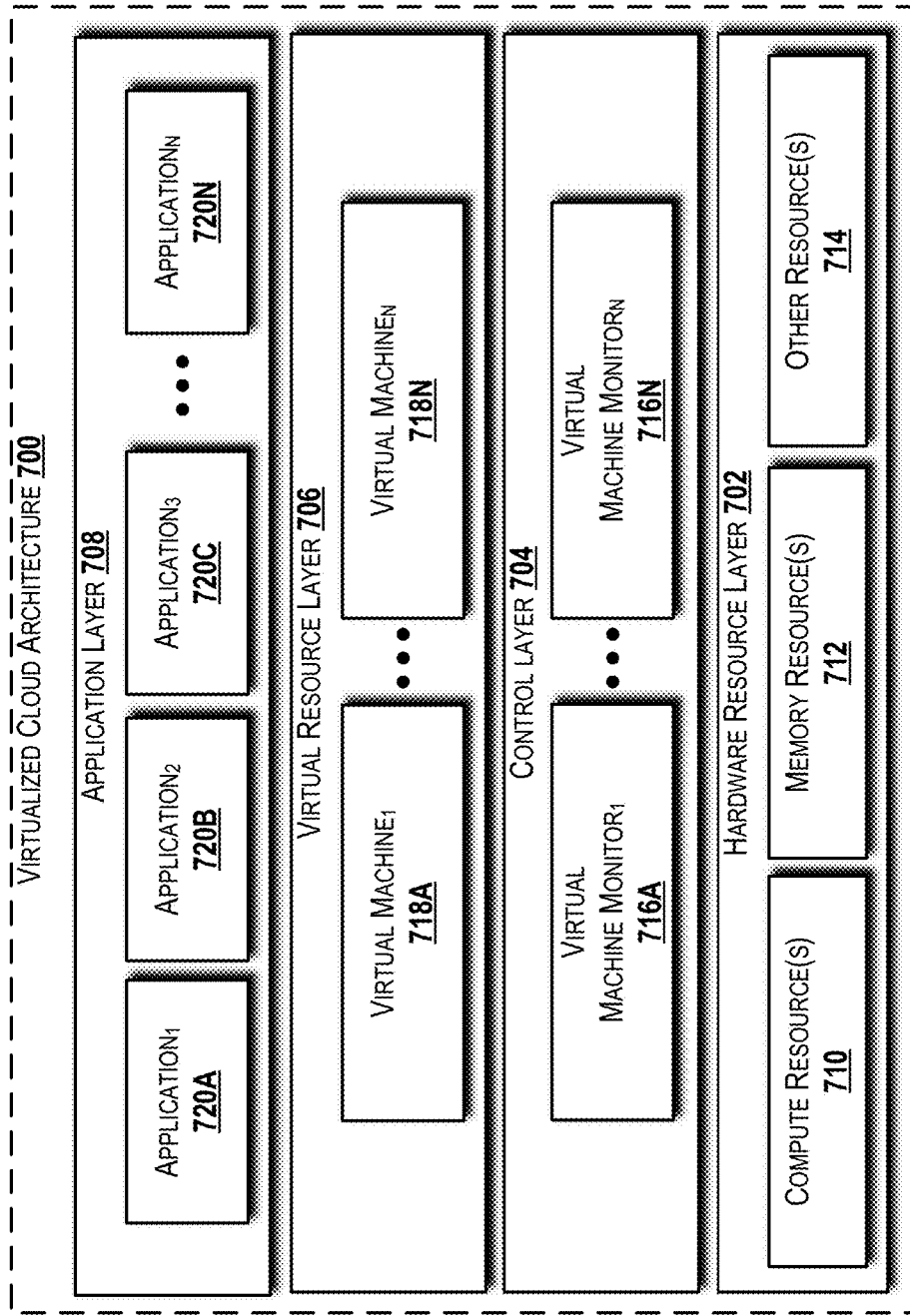
FIG. 7 is a block diagram illustrating a virtualized cloud architecture capable of implementing aspects of the concepts and technologies disclosed herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, the event management system 106, the event attendee device(s) 116, the presentation device(s) 122, the network(s) 124/318/500, or some combination thereof. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, California, and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors;" hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708.

Based on the foregoing, it should be appreciated that aspects of automated optimization of events by engagement and format have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
    creating, by an event management system comprising a processor, an event for a specified topic based upon input provided, at least in part, by an event creator, wherein the input identifies a plurality of event attendees;
    receiving, by the event management system, a selection of a desired audience for the event, wherein receiving the selection of the desired audience for the event comprises receiving, by the event management system, the selection of at least one of the plurality of event attendees as the desired audience, and wherein the selection comprises an inferred selection or a manual selection;
    determining, by the event management system, at least one device associated with at least a portion of the desired audience;
    accepting, by the event management system, an initial event content to be presented during the event;
    determining, by the event management system, a time for the event;
    performing, by the event management system, engagement sampling during the event, wherein performing the engagement sampling comprises monitoring, via at least one biometric sensor, biometrics of the at least one of the plurality of event attendees;
    utilizing, by the event management system, the selection of the desired audience, the at least one device associated with at least the portion of the desired audience, the time for the event, and the engagement sampling to optimize the event, wherein the event is optimized by modifying, by the event management system, at least a portion of the initial event content automatically during the event; and
    determining, by the event management system, a follow-up action to be performed after the event.

2. The method of claim 1, wherein the input further identifies the initial event content, a location for the event, and an event presenter.

3. The method of claim 1, wherein modifying at least a portion of the initial event content automatically during the event comprises:
    determining, by the event management system, a modification to the initial event content;
    analyzing, by the event management system, the modification to determine whether to apply the modification to the initial event content; and
    applying, by the event management system, the modification to the initial event content.

4. The method of claim 3, wherein performing, by the event management system, the engagement sampling comprises:
    monitoring, by the event management system, a traditional activation of at least a portion of the plurality of event attendees;
    monitoring, by the event management system, a question and answer session;
    monitoring, by the event management system, an event acceptance rate;
    mining, by the event management system, a specific event topic for relevance;
    monitoring, by the event management system, a social interaction among at least a portion of the plurality of event attendees; or
    monitoring, by the event management system, a multi-tasking interaction of at least a portion of the plurality of event attendees.

5. The method of claim 1, further comprising obtaining, by the event management system, feedback during the event and after the event, wherein obtaining the feedback comprises obtaining, by the event management system, attendee feedback during the event and after the event.

6. An event management system comprising:
    a processor; and
    a memory comprising instructions that, when executed by the processor, cause the processor to perform operations comprising
        creating an event for a specified topic based upon input provided, at least in part, by an event creator, wherein the input identifies a plurality of event attendees,
        receiving a selection of a desired audience for the event, wherein receiving the selection of the desired audience for the event comprises receiving, by the event management system, the selection of at least one of the plurality of event attendees as the desired audience, and wherein the selection comprises an inferred selection or a manual selection,
        determining at least one device associated with at least a portion of the desired audience, accepting an initial event content to be presented during the event, determining a time for the event, performing engagement sampling during the event, wherein performing the engagement sampling comprises monitoring, via at least one biometric sensor, biometrics of the at least one of the plurality of event attendees, utilizing the selection of the desired audience, the at least one device associated with at least the portion of the desired audience, the time for the event, and the engagement sampling to optimize the event, wherein the event is optimized by modifying at least a portion of the initial event content automatically during the event, and determining a follow-up action to be performed after the event.

7. The event management system of claim 6, wherein the input further identifies the initial event content, a location for the event, and an event presenter.

8. The event management system of claim 6, wherein modifying at least a portion of the initial event content automatically during the event comprises:

determining a modification to the initial event content;

analyzing the modification to determine whether to apply the modification to the initial event content; and applying the modification to the initial event content.

9. The event management system of claim 8, wherein performing the engagement sampling comprises:

monitoring a traditional activation of at least a portion of the plurality of event attendees;

monitoring a question and answer session;

monitoring an event acceptance rate;

mining a specific event topic for relevance;

monitoring a social interaction among at least a portion of the plurality of event attendees; or monitoring a multi-tasking interaction of at least a portion of the plurality of event attendees.

10. The event management system of claim 6, wherein the operations further comprise obtaining feedback during the event and after the event, wherein obtaining the feedback comprises obtaining attendee feedback during the event and after the event.

11. A computer-readable storage medium comprising computer-executable instructions that, when executed by a processor of an event management system, cause the processor to perform operations comprising:

creating an event for a specified topic based upon input provided, at least in part, by an event creator, wherein the input identifies a plurality of event attendees;

receiving a selection of a desired audience for the event, wherein receiving the selection of the desired audience for the event comprises receiving, by the event management system, the selection of at least one of the plurality of event attendees as the desired audience, and wherein the selection comprises an inferred selection or a manual selection;

determining at least one device associated with at least a portion of the desired audience;

accepting an initial event content to be presented during the event;

determining a time for the event;

performing engagement sampling during the event, wherein performing the engagement sampling comprises monitoring, via at least one biometric sensor, biometrics of the at least one of the plurality of event attendees;

utilizing the selection of the desired audience, the at least one device associated with at least the portion of the desired audience, the time for the event, and the engagement sampling to optimize the event, wherein the event is optimized by modifying at least a portion of the initial event content automatically during the event; and determining a follow-up action to be performed after the event.

12. The computer-readable storage medium of claim 11, wherein the input further identifies the initial event content, a location for the event, and an event presenter.

13. The computer-readable storage medium of claim 11, wherein modifying at least a portion of the initial event content automatically during the event comprises:

determining a modification to the initial event content;

analyzing the modification to determine whether to apply the modification to the initial event content; and applying the modification to the initial event content.

14. The computer-readable storage medium of claim 13, wherein performing the engagement sampling comprises:

monitoring a traditional activation of at least a portion of the plurality of event attendees;

monitoring a question and answer session;

monitoring an event acceptance rate;

mining a specific event topic for relevance;

monitoring a social interaction among at least a portion of the plurality of event attendees; or monitoring a multi-tasking interaction of at least a portion of the plurality of event attendees.

* * * * *